United States Patent [19]

Bonniwell et al.

[11] 4,363,521

[45] Dec. 14, 1982

[54] WHEEL DISC OFFSET ATTACHMENT TO WHEEL RIM

[75] Inventors: Joel C. Bonniwell, Hawthorne; William A. Ocheltree, Van Nuys, both of Calif.

[73] Assignee: Cragar Industries Inc., Compton, Calif.

[21] Appl. No.: 176,083

[22] Filed: Aug. 7, 1980

[51] Int. Cl.³ .............................................. B60B 23/00
[52] U.S. Cl. ................................. 301/63 R; 301/65
[58] Field of Search .............. 301/6 E, 63 R, 65; 29/159.01, 159.03; 152/381.4

[56] References Cited

U.S. PATENT DOCUMENTS

| | | | |
|---|---|---|---|
| 1,714,622 | 5/1929 | Putnam | 301/63 R |
| 2,083,327 | 6/1937 | Eksergian | 301/63 R X |
| 3,250,571 | 5/1966 | Richter | 301/65 |
| 3,250,572 | 5/1966 | Walfer | 301/65 |
| 3,302,273 | 2/1967 | Benton et al. | 301/65 X |
| 3,399,930 | 9/1968 | Bennett | 301/65 |
| 3,410,606 | 11/1968 | Benton et al. | 301/65 |
| 3,827,756 | 8/1974 | Mitchell | 301/63 R |

FOREIGN PATENT DOCUMENTS

| | | | |
|---|---|---|---|
| 2821646 | 11/1979 | Fed. Rep. of Germany | 301/6 E |
| 463319 | 3/1937 | United Kingdom | 301/65 |

Primary Examiner—Charles A. Marmor
Attorney, Agent, or Firm—William W. Haefliger

[57] ABSTRACT

A wheel outer body portion interfits a rim outboard hump, and insert structure on that outer body portion attaches to the rim proximate a rim annular wall between the hump and a rim well portion.

9 Claims, 10 Drawing Figures

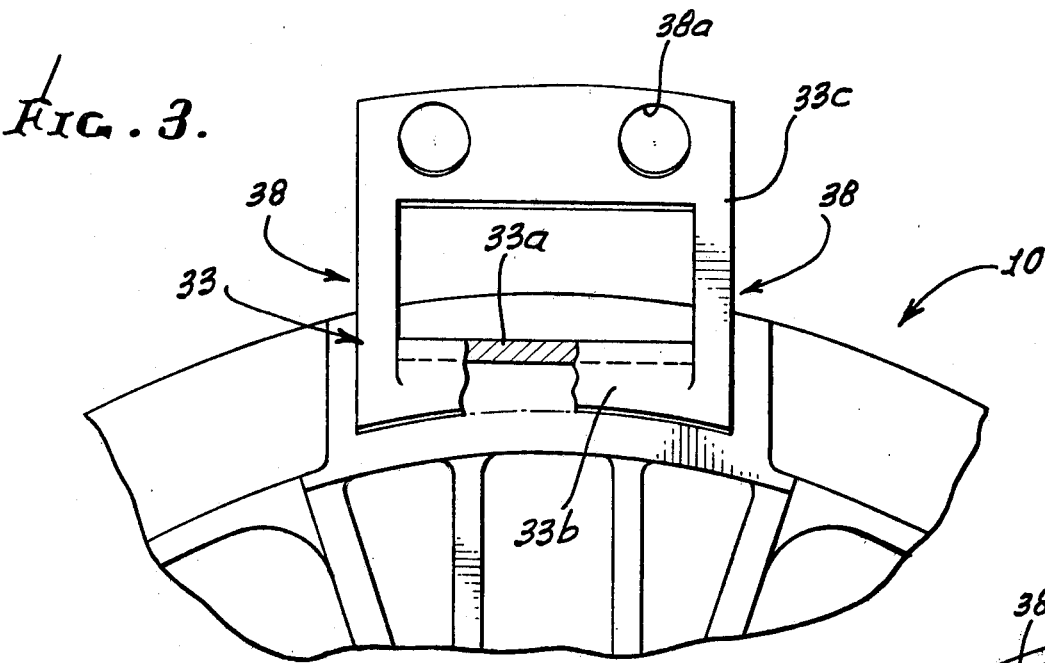
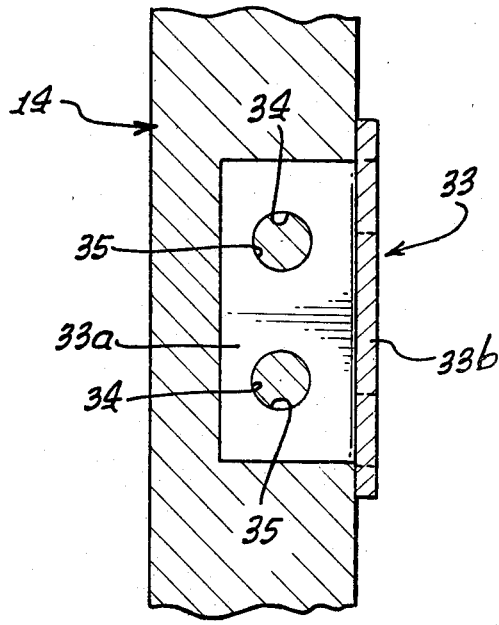
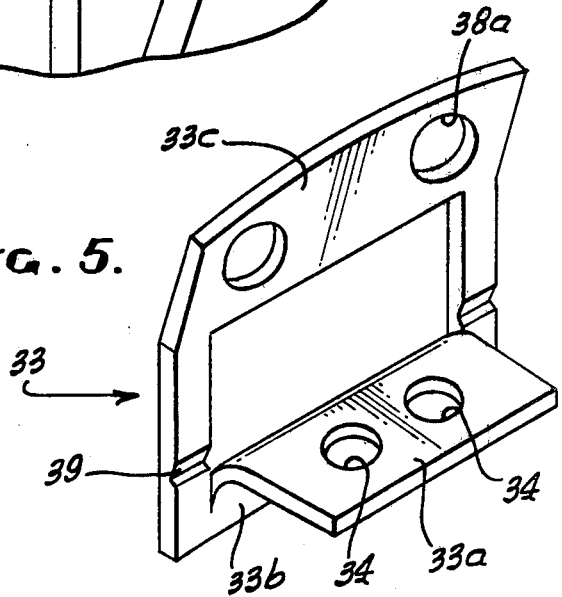
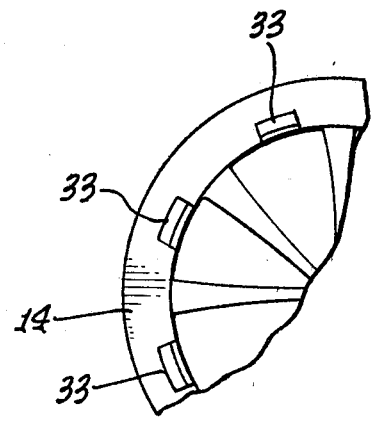

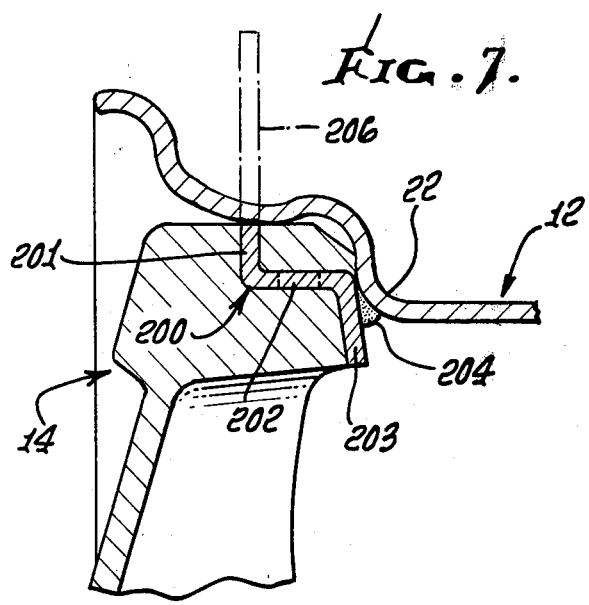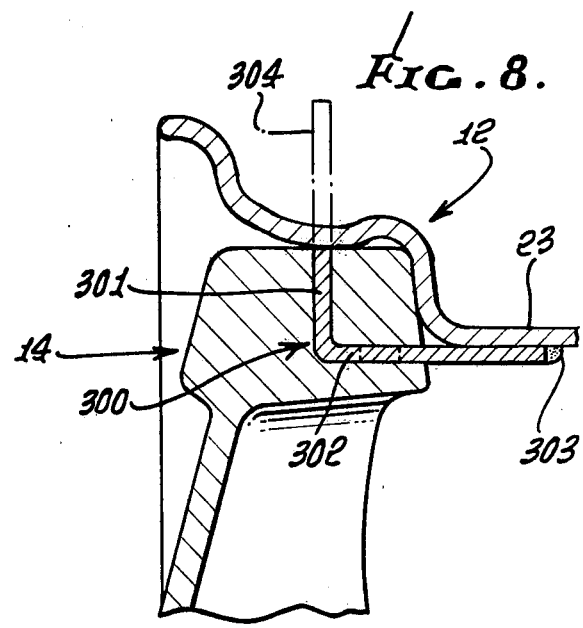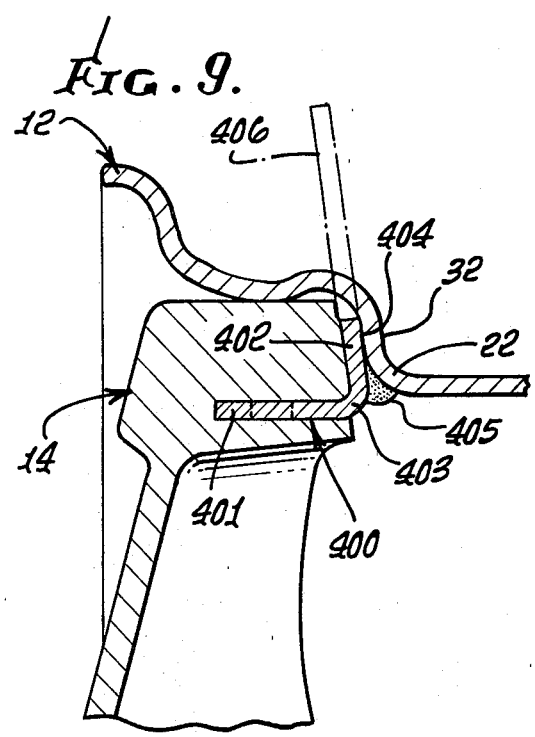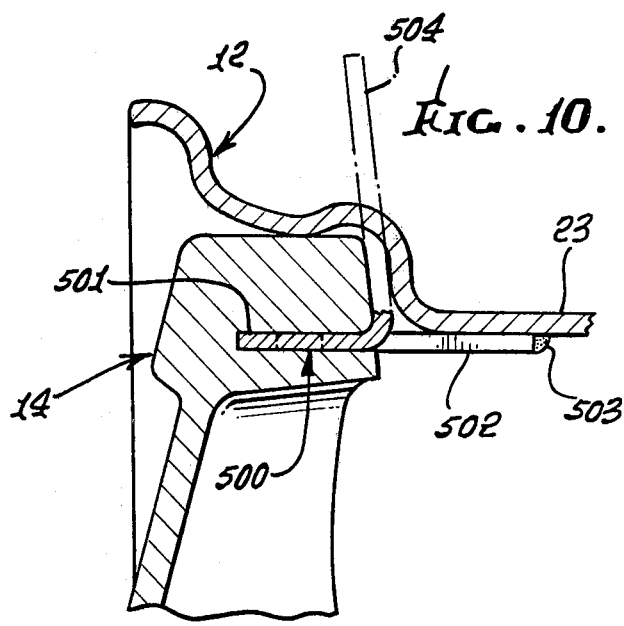

WHEEL DISC OFFSET ATTACHMENT TO WHEEL RIM

BACKGROUND OF THE INVENTION

This invention relates generally to the construction of wheels, and more particularly concerns the connection of vehicle wheel bodies to wheel rims.

In the past, it was known to connect steel wheel discs to steel rims, as by riveting or spot (or arc) welding the disc outer flange to the rim well. The latter is that part of the rim which is closest to the wheel axis. As a result, the disc or a portion thereof occupied the zone radially inwardly of the well.

Recently, need has developed for displacing the body (disc or spider) out of that zone, which means that it can no longer be connected to the rim well.

SUMMARY OF THE INVENTION

It is a major object of the invention to provide a solution to the above need. At the same time it is another object to facilitate connection of the rim to the body where they consist of dissimilar metallic materials.

Basically, the invention which meets the described need is embodied in a wheel body especially adapted for connection to a tire mounting rim having an inboard hump and bead seat, a well portion, an outboard hump, an outboard bead seat portion at the outboard side of the outboard hump, and an annular wall between that well portion and the outboard hump. The special body has:

(a) an annular outer portion extending about the body axis;

(b) that outer portion also having a first annularly extending surface which faces radially outwardly and is located to interfit the outboard hump; and (c) there being means on the body outer portion to attach to the rim proximate the described annular wall thereof.

As will appear, such means advantageously comprises an insert in the body exposed for weld connection to the rim annular wall, the insert and rim consisting of the same metallic material, whereby the body may then consist of another metallic material; the insert may have L-shape with one leg to project into the body outer annular portion and another leg exposed to be welded to the rim; multiple of such inserts may be employed, about the wheel axis; and the location of the inserts enables the body to remain outside (i.e. axially offset from) the space radially inwardly of the rim well.

These and other objects and advantages of the invention, as well as the details of an illustrative embodiment, will be more fully understood from the following description and drawings, in which:

DRAWING DESCRIPTION

FIG. 3 is an enlarged elevation, on lines 3—3 of FIG. 2;

FIG. 4 is a section on lines 4—4 of FIG. 2; and

FIG. 5 is a perspective view of a wheel insert incorporation the invention;

FIG. 6 is an elevation showing the wheel with multiple inserts;

FIGS. 7-10 are views like FIG. 1, showing modifications.

DETAILED DESCRIPTION

Figure 1:
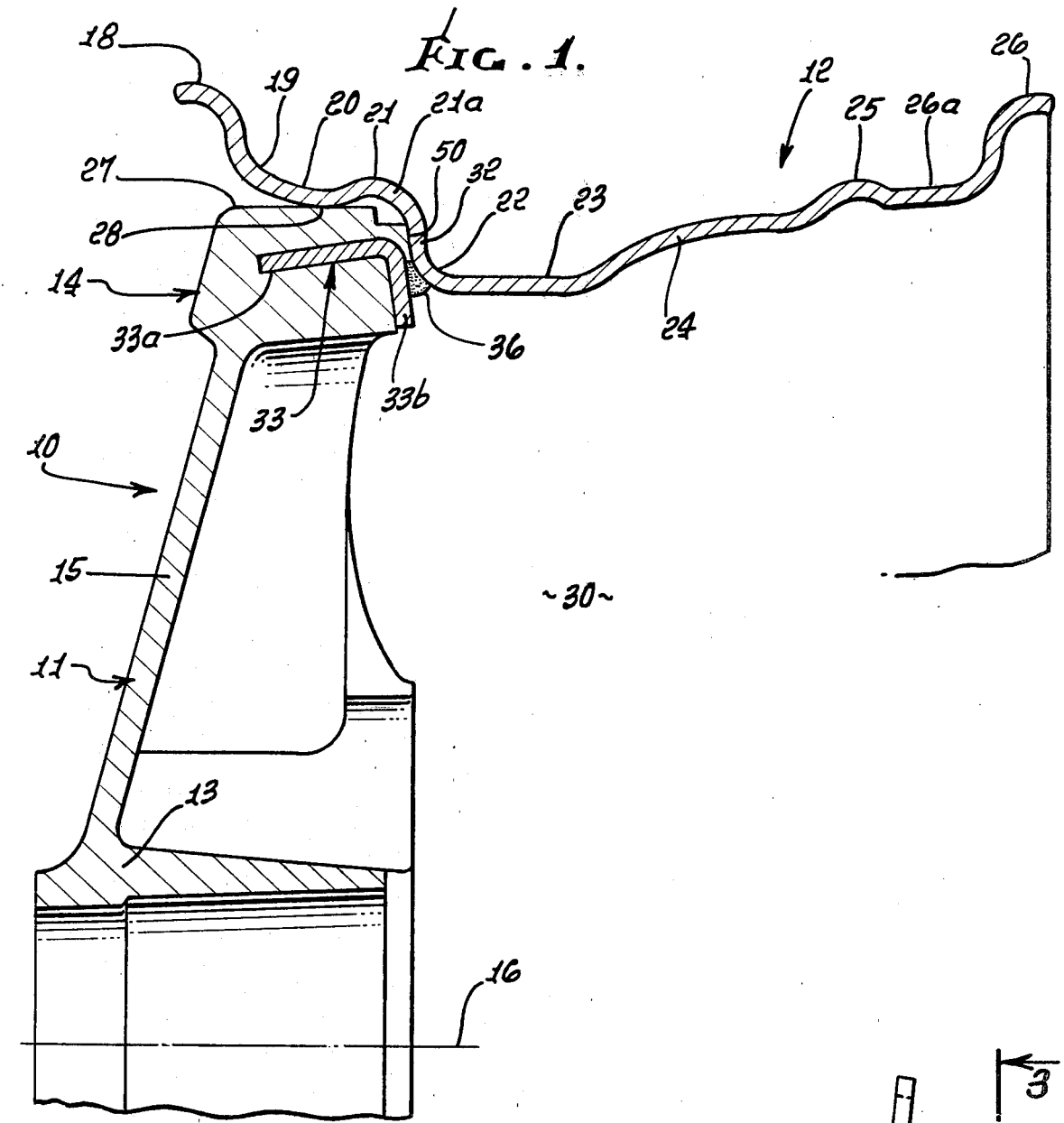
FIG. 1 is a fragmentary section in an axial radial plane, through a wheel incorporating the invention.

In FIG. 1 a wheel 10 includes a spider 11 and a rim 12. The spider is illustrative of one form of wheel body, there being other forms such as discs. The illustrated spider has a center hub portion 13, on outer annular portion 14, and radially extending spider legs 15 integral with the portions 13 and 14, and spaced apart about central axis 16.

Elements of the rim 12 are defined and identified as follows:

| Identifying Number | Element (annular) |
| --- | --- |
| 18 | outboard flange |
| 19 | outboard bead seat radius |
| 20 | outboard bead seat |
| 21 | outboard hump |
| 22 | well bend (radius) |
| 23 | well |
| 24 | inboard leg |
| 25 | inboard hump |
| 26 | inboard flange |
| 26a | inboard bead seat |

The metallic rim typically is annular and has substantially constant thickness.

In accordance with the invention, the body outer annular portion 14 is adapted to interfit and attach to the rim in the generally L-shaped recess formed by and between the elements 21 and 22; thus, the body outer annular portion 14 has a first annularly extending surface 27 which faces radially outwardly and is located to interfit the inner surface of the hump 21, at the hump radially innermost crest 28. The rounded extent 21a of the hump is adapted to flex slightly to accommodate this close interfit. Accordingly, that interfit acts to center the wheel body and rim, coaxially. In addition, the body outer portion 14 has an annular shoulder 50 facing wall 32 (to be described) and adapted to engage same for positioning the body axially relative to the rim.

Further, means is provided on the wheel body outer portion to attach to the rim, proximate the well bend 22. Accordingly, the body and rim are relatively coaxially centered, and integrally attached to one another to define a wheel unit; further, the attachment is characterized as locating the body 11 generally to the left (in FIG. 1) of the zone 30 inwardly of the well 23, as may be required for certain wheel designs; and still further, the attachment allows for dissimilar body and rim metallic compositions, as will be clear from the following description.

Figure 2:
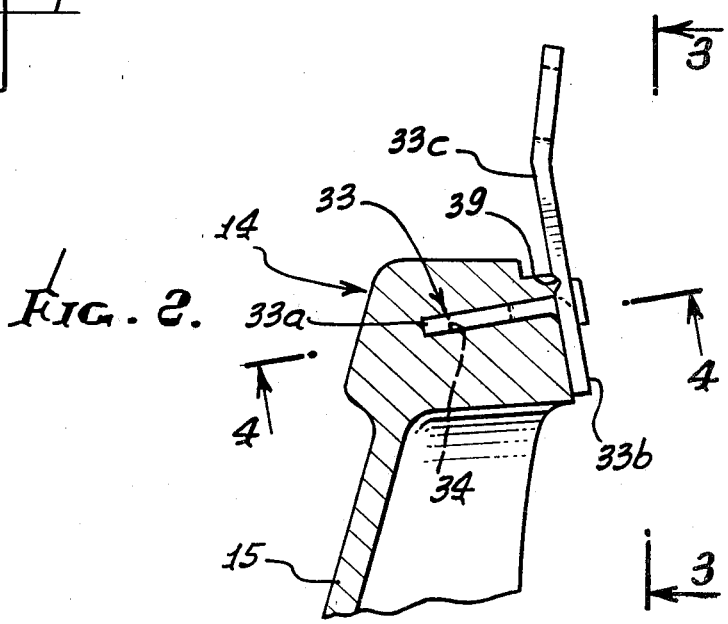
FIG. 2 is an enlarged section through a portion of wheel spider to be connected to the rim of FIG. 1.

Referring to FIGS. 1 and 2, the means referred to typically and advantageously takes the form of an insert in the body and exposed for weld connection to the rim annular wall 32 which forms an outward continuation of the bend 22 and which extends between said bend 22 and the hump 21. As shown, the insert 33 is in the form of a thin plate which is L-shaped in section in axial radial planes. The section has a first leg 33a penetrating the body outer portion, for secure retention. As is clear from FIG. 4, the first leg 33a typically has one or more holes 34 therein and into which body material is received, during molding or casting of the body, whereby the insert has shoulders 35 interfitting the body material in those holes to block withdrawal of the insert from the body.

The insert section shown in FIG. 1 also has a second leg 33b exposed at the side of the body outer portion 14, to be weld connected to the rim, at 36 (i.e. proximate to outer rim wall 32 and bend 22). The construction facilitates the use of an insert consisting of the same metallic material as the rim (as for example steel, whereas the cast body 11 may consist of another or a dissimilar metallic material (as for example aluminum). The insert is axially slightly offset from the annular wall 32, radially inwardly of the second annularly extending surface 50, to provide a weld receiving gap.

In addition, in its original condition, i.e. at the time of casting the wheel body with the insert (or inserts spaced about axis 16) in place, the insert includes an extension in the form of a third leg 33c projecting generally radially outwardly and used to position the insert during such connection to the body outer portion 14. For example, it may be gripped by a clamp over area 38 and/or pins through locater 38a as shown in FIG. 3. Subsequently, the third leg may be removed, as by bending and fracture thereof along weakening score line 39 shown in FIG. 2. Note that leg 33c extends in the general direction of leg 33b, and may comprise an extension thereof.

Multiple of the inserts may be spaced about the wheel, which is shown in FIGS. 5 and 6.

The alternate configurations in FIGS. 7-10 are generally like FIG. 1, except for the shape of the insert. In FIG. 7, the insert 200 has Z shape, with legs 201, 202 and 203. Legs 201 and 202 penetrate body 14, and leg 203 is exposed to be welded at 204 to bend 22.

In FIG. 8 the insert 300 again has L-shape, with legs 301 and 302. Leg 301 and part of leg 302 penetrate body 14. The remainder of leg 302 projects from the body and beneath well 23, for weld connection to the latter at 303.

In FIG. 9 the insert 400 has reverse L-shaped configuration, with legs 401 and 402. Leg 401 penetrates body 14, and leg 402 extends upwardly from insert bend 403 to engage rim wall 32 at 404. The insert bend 403 is weld connected at 405 to the rim bend 22.

In FIG. 10, the insert 500 includes legs 501 and 502. Leg 501 penetrates the body 14, and leg 502 projects from the body in the same general plane of leg 501, for weld connection at 503 to the rim well 23.

Removable insert legs (additional) appear at 206, 304, 406, and 504. These correspond to leg 33c in FIG. 2.

We claim:

1. In combination with a metallic wheel rim adapted to mount a tire, the rim having an inboard hump, a well portion, an outboard hump, an outboard bead seat portion at the outboard side of the outboard hump, and an annular wall between said well portion and said outboard hump,
   (a) a wheel body having a radially thickened annular outer portion extending about an axis defined by the body,
   (b) said body outer portion having a first annularly extending surface which faces radially outwardly and locally interfits a radially innermost crest of said outboard hump and beadseat portion at the radially inner side thereof,
   (c) generally L-shaped insert means on said body outer portion and attached to said rim proximate said annular wall thereof and proximate a bend defined by the L-shape,
   (d) said body also having a second annularly extending surface which faces generally axially and locally interfits said rim annular wall, said second surface located proximate to and radially outwardly of the bend defined by said L-shaped insert, said thickened annular portion confined at the outboard hump side of said rim annular wall,
   (e) said insert means axially offset from said annular wall radially inwardly of said second annularly extending surface to provide a weld receiving gap.

2. The invention of claim 1 wherein said (c) insert means has a first leg spaced radially inwardly of said body first annularly extending surface and confined in said thickened annular outer portion.

3. The invention of claim 2 wherein said (c) insert means includes a second leg projecting from the body and exposed for weld connection to said rim proximate said annular wall thereof and proximate said bend, said second leg located generally radially inwardly of said body second surface.

4. The invention of claim 3 wherein the body consists of a metallic material dissimilar to the insert material, the insert projecting into the body and having shoulders interfitting the body to block withdrawal of the insert from the body.

5. The invention of claim 3 wherein said insert has generally L-shaped section in axial radial planes, said insert first leg penetrating into the body outer portion.

6. The invention of claim 5 wherein said insert second leg is exposed at and adjacent the side of the body outer portion, to project generally radially inwardly.

7. The invention of claim 6 wherein said insert has an extension projecting generally radially outwardly for positioning the insert during connection of the first leg to the body outer portion.

8. The invention of claim 6 including multiple of said inserts spaced about said body outer portion.

9. The invention of claim 1 wherein said insert and said wheel rim consist of the same metallic material.

* * * * *